(12) United States Patent
Ohsawa et al.

(10) Patent No.: US 10,886,569 B2
(45) Date of Patent: Jan. 5, 2021

(54) NON-AQUEOUS ELECTROLYTE SECONDARY BATTERY AND METHOD OF PRODUCING THE SAME

(71) Applicant: Toyota Jidosha Kabushiki Kaisha, Toyota (JP)

(72) Inventors: Ryosuke Ohsawa, Okazaki (JP); Akira Tsujiko, Miyoshi (JP); Kaoru Inoue, Hirakata (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 135 days.

(21) Appl. No.: 16/141,211

(22) Filed: Sep. 25, 2018

(65) Prior Publication Data

US 2019/0140308 A1    May 9, 2019

(30) Foreign Application Priority Data

Nov. 9, 2017    (JP) .................. 2017-216415

(51) Int. Cl.
*H01M 10/058* (2010.01)
*H01M 4/36* (2006.01)
(Continued)

(52) U.S. Cl.
CPC ......... *H01M 10/058* (2013.01); *H01M 2/022* (2013.01); *H01M 4/133* (2013.01); *H01M 4/134* (2013.01); *H01M 4/1393* (2013.01); *H01M 4/1395* (2013.01); *H01M 4/362* (2013.01); *H01M 4/364* (2013.01); *H01M 4/386* (2013.01); *H01M 4/587* (2013.01); *H01M 10/049* (2013.01); *H01M 10/0525* (2013.01); *H01M 10/44* (2013.01); *H01M 10/446* (2013.01);
(Continued)

(58) Field of Classification Search
CPC .... H01M 10/058; H01M 4/364; H01M 2/022; H01M 10/44; H01M 2004/027; H01M 2004/021; H01M 4/362; H01M 4/1395; H01M 10/446; H01M 10/0525; H01M 4/134; H01M 4/1393; H01M 4/386; H01M 4/133; H01M 4/587; H01M 10/049; Y02E 60/10
USPC ........................................ 429/209
See application file for complete search history.

(56) References Cited

U.S. PATENT DOCUMENTS

2015/0303520 A1    10/2015    Kaiduka et al.
2018/0069234 A1*    3/2018    Friend .............. H01M 4/625

FOREIGN PATENT DOCUMENTS

WO    2008/106280 A1    9/2008
WO    2014/068903 A1    5/2014

* cited by examiner

*Primary Examiner* — Jonathan G Jelsma
*Assistant Examiner* — Omar M Kekia
(74) *Attorney, Agent, or Firm* — Dinsmore & Shohl LLP (57) ABSTRACT

A non-aqueous electrolyte secondary battery includes a negative electrode, a positive electrode, and an electrolyte solution. The electrolyte solution contains at least one selected from the group consisting of ethylene carbonate, fluoroethylene carbonate, and vinylene carbonate. The negative electrode includes a negative electrode mixture layer. The negative electrode mixture layer contains a silicon-containing particle and a graphite particle. In a Log-differential pore volume distribution of the negative electrode mixture layer, the ratio of a Log-differential pore volume at a pore diameter of 2 μm to a Log-differential pore volume at a pore diameter of 0.2 μm is within a range of 10.5 to 33.1.

5 Claims, 4 Drawing Sheets (51) Int. Cl.
    *H01M 10/44*     (2006.01)
    *H01M 2/02*     (2006.01)
    *H01M 4/134*     (2010.01)
    *H01M 10/04*     (2006.01)
    *H01M 4/38*     (2006.01)
    *H01M 4/133*     (2010.01)
    *H01M 4/1393*     (2010.01)
    *H01M 4/587*     (2010.01)
    *H01M 4/1395*     (2010.01)
    *H01M 10/0525*     (2010.01)
    *H01M 4/02*     (2006.01)

(52) U.S. Cl.
    CPC .......................... *H01M 2004/021* (2013.01);
                                      *H01M 2004/027* (2013.01)

NON-AQUEOUS ELECTROLYTE SECONDARY BATTERY AND METHOD OF PRODUCING THE SAME

CROSS-REFERENCE TO RELATED APPLICATIONS

The present application claims priority to Japanese Patent Application No. 2017-216415 filed on Nov. 9, 2017, the entire contents of which are hereby incorporated by reference into this application.

BACKGROUND

1. Technical Field

The present disclosure relates to a non-aqueous electrolyte secondary battery and a method of producing the same.

2. Description of Related Art

WO 2014/068903 A1 discloses a negative electrode containing silicon-containing particles and graphite particles and an electrolyte solution containing ethylene carbonate and fluoroethylene carbonate.

SUMMARY

Graphite particles have conventionally been used as a negative electrode active material for non-aqueous electrolyte secondary batteries. The combined use of silicon-containing particles and graphite particles has also been studied. Silicon-containing particles have a higher specific capacity (capacity per unit mass) than graphite particles. The combined use of silicon-containing particles and graphite particles is expected to yield a higher battery capacity than the use of graphite particles alone.

However, the combined use of silicon-containing particles and graphite particles tends to cause a deterioration of cycle characteristics. Charge/discharge-induced swelling of silicon-containing particles is larger than that of graphite particles. The large swelling of silicon-containing particles is thought to lead to damage to the electrode structure in the vicinity of the silicon-containing particles and therefore to disruption of electron conduction paths between the adjacent particles. Thus, the silicon-containing particles are thought to be electrically isolated.

The present disclosure provides a non-aqueous electrolyte secondary battery containing a silicon-containing particle and a graphite particle as negative electrode active materials and having improved cycle characteristics.

Hereinafter, the technical features and advantageous effects of the present disclosure will be described. It should be noted that the description of the mechanism of action in the present disclosure includes hypotheses. The scope of the claims should not be limited fey the validity of the described mechanism of action.

A non-aqueous electrolyte secondary battery according to a first aspect of the present disclosure includes a negative electrode, a positive electrode, and an electrolyte solution. The electrolyte solution contains at least one selected from the group consisting of ethylene carbonate, fluoroethylene carbonate, and vinylene carbonate. The negative electrode includes a negative electrode mixture layer. The negative electrode mixture layer contains a silicon-containing particle and a graphite particle. In a Log-differential pore volume distribution of the negative electrode mixture layer, a ratio of a Log-differential pore volume at a pore diameter of 2 μm to a Log-differential pore volume at a pore diameter of 0.2 μm is within a range of 10.5 to 33.1.

The "ratio of a Log-differential pore volume at a pore diameter of 2 μm to a Log-differential pore volume at a pore diameter of 0.2 μm" can be considered an index indicating the proportion between large pores and small pores. It is thought that the larger this ratio is, the higher the proportion of large pores is. Hereinafter, this ratio may be referred to as "$V_2/V_{0.2}$".

The fact that $V_2/V_{0.2}$ is 10.5 or more and 33.1 or less is expected to provide an improvement in cycle characteristics. It is thought that, due to the negative electrode mixture layer having large pores in an appropriate proportion, large swelling of the silicon-containing particles is absorbed by the pores. This is thought to reduce damage to the electrode structure.

If $V_2/V_{0.2}$ is less than 10.5, the proportion of large pores is low, which can lead to a failure to sufficiently absorb the swelling of the silicon-containing particles. If $V_2/V_{0.2}$ is more than 33.1, the proportion of large pores is excessively high, and thus electron conduction paths are intrinsically difficult to form, which can cause decreased use efficiency of the silicon-containing particles. That is, the initial capacity and initial efficiency can decline.

The first aspect may be such that the ratio is within a range of 10.5 to 26.6.

In this instance, an improvement in cycle characteristics is expected. This is presumably because the fact that $V_2/V_{0.2}$ is 26.6 or less, namely the proportion of large pores is moderately low, creates a state where the silicon-containing particle and graphite particle are not too far apart from each other. Furthermore, the state where the silicon-containing particle and graphite particle are not too far apart from each other is expected to lead to increased use efficiency of the silicon-containing particle. That is, improvements in the initial capacity and initial efficiency are also expected.

A method of producing a non-aqueous electrolyte secondary battery according to a second aspect of the present disclosure includes the following (a) to (d): (a) preparing a composite particle by attaching at least one solid material selected from the group consisting of ethylene carbonate, fluoroethylene carbonate, and vinylene carbonate to the surface of a silicon-containing particle (b) producing a negative electrode by forming a negative electrode mixture layer containing the composite particle and a graphite particle; (c) assembling a non-aqueous electrolyte secondary battery including at least the negative electrode, a positive electrode, and an electrolyte solution; and (d) forming pores in the negative electrode mixture layer by dissolving the solid material in the electrolyte solution. The pores are formed such that in a Log-differential pore volume distribution of the negative electrode mixture layer, a ratio of a Log-differential pore volume at a pore diameter of 2 μm to a Log-differential pore volume at a pore diameter of 0.2 μm is within a range of 10.5 to 33.1.

In (a) above, ethylene carbonate (EC), fluoroethylene carbonate (FEC), and vinylene carbonate (VC) are each a solid material soluble in the electrolyte solution. The solid material can be dissolved in the electrolyte solution after assembling of the battery. The solid material becomes a component of the electrolyte solution by being dissolved in the electrolyte solution. The dissolution of the solid material in the electrolyte solution is thought to result in the formation of large pores around the silicon-containing particles in the negative electrode mixture layer. Since the formation of large pores is accomplished so as to yield $V_2/V_{0.2}$ of 10.5 or more and 33.1 or less, an improvement in cycle characteristics is expected.

In the second aspect, the pores may be formed such that the ratio is within a range of 10.5 to 26.6.

In this instance, an improvement in cycle characteristics is expected. This is presumably because the fact that $V_2/V_{0.2}$ is 26.6 or less, namely the proportion of large pores is moderately low, creates a state where the silicon-containing particle and graphite particle are not too far apart from each other. Furthermore, the state where the silicon-containing particle and graphite particle are not too far apart from each other is expected to lead to increased use efficiency of the silicon-containing particle. That is, improvements in the initial capacity and initial efficiency are also expected.

In the second aspect, the method may include carrying out initial charge of the non-aqueous electrolyte secondary battery after forming the pores in the negative electrode mixture layer.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the present disclosure (this embodiment may be referred to as "present embodiment" in the present specification) will be described. It should be noted that the following description is not intended to limit the scope of the appended claims. In the following description, a now-aqueous electrolyte secondary battery may be simply referred to as "battery".

Non-Aqueous Electrolyte Secondary Battery

Figure 1:
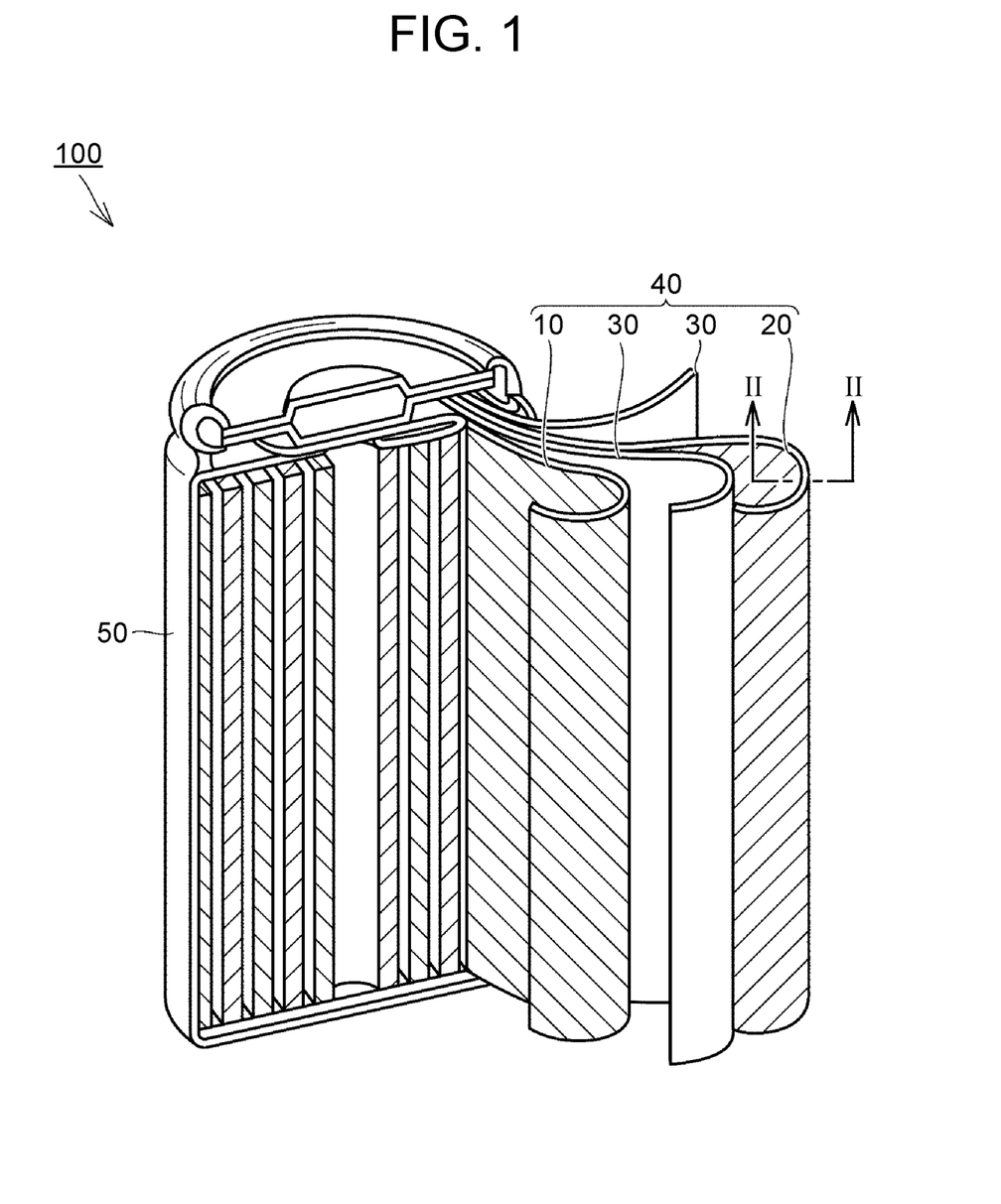
FIG. 1 is a schematic diagram showing an example of the configuration of a non-aqueous electrolyte secondary battery according to the present embodiment.

FIG. 1 is a schematic diagram showing an example of the configuration of a non-aqueous electrolyte secondary battery of the present embodiment. The battery 100 includes a case 50. The case 50 is of cylindrical shape. The case 50 should not be limited to a cylindrical shape. The case 50 may, for example, be of rectangular shape (flat, rectangular parallelepiped shape).

The case 50 is hermetically closed. The case 50 can be made of, for example, iron, stainless steel, or aluminum (Al) alloy. The case 50 may be, for example, a pouch made of an Al laminated film. That is, the battery 100 may be a laminated battery. The case 50 may be equipped with a current interrupt device (CID), a gas outlet valve, etc.

The case 50 contains an electrode assembly 40 and an electrolyte solution. The electrode assembly 40 includes a negative electrode 20, a positive electrode 10, and a separator 30. The electrolyte solution is impregnated in the electrode assembly 40. That is, the battery 100 includes at least the negative electrode 20, the positive electrode 10, and the electrolyte solution.

The electrode assembly 40 is in a spirally wound form. The electrode assembly 40 is formed by stacking the positive electrode 10, the separator 30, the negative electrode 20, and the separator 30 in this order and spirally winding them together. The electrode assembly 40 may be in a stacked form. When the electrode assembly 40 is in a stacked form, the electrode assembly 40 is formed by stacking the positive electrodes 10 and negative electrodes 20 alternately. The separator 30 is disposed between each pair of the positive electrode 10 and negative electrode 20.

Negative Electrode

The negative electrode 20 is a sheet. The negative electrode 20 is strip-shaped. The negative electrode 20 includes at least a negative electrode mixture layer 22. The negative electrode 20 may further include a negative electrode current collector 21. The negative electrode current collector 21 may be, for example, a copper (Cu) foil or a Cu alloy foil. The negative electrode current collector 21 may have a thickness of, for example, 5 μm or more and 50 μm or less. The thickness of each component, as described in the present specification, is measured, for example, with a micrometer. The thickness of each component may be measured in a microscope cross-sectional image. The measurement of the thickness of each component is conducted on at least three points. The arithmetic mean of the thicknesses at the at least three points is defined as the thickness of the component.

Figure 2:
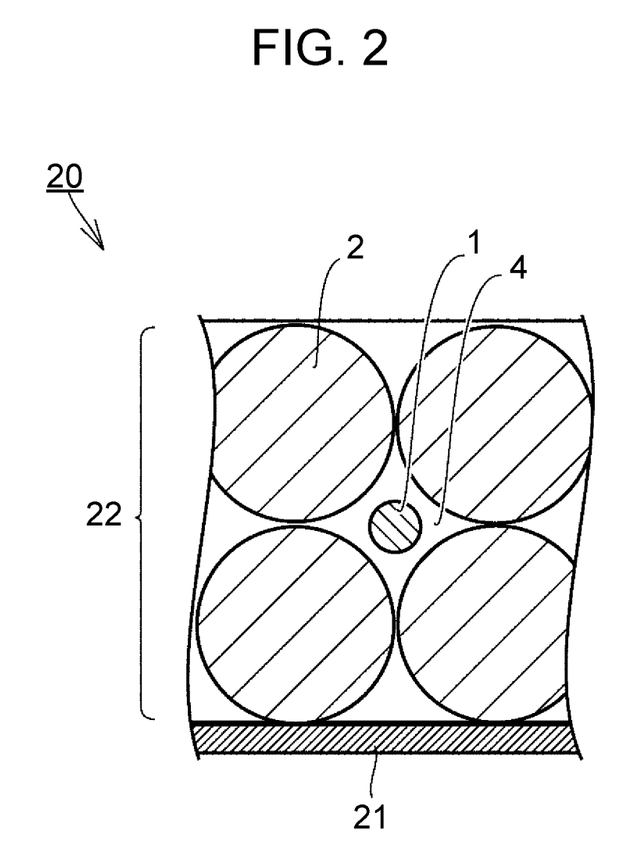
FIG. 2 is a conceptual sectional view along the line II-II of FIG. 1.

FIG. 2 is a conceptual sectional view along the line II-II of FIG. 1. The negative electrode mixture layer 22 may be formed, for example, on the surface of the negative electrode current collector 21. The negative electrode mixture layer 22 may be formed on both major faces of the negative electrode current collector 21. The negative electrode mixture layer 22 may have a thickness of, for example, 10 μm or more and 200 μm or less. The negative electrode mixture layer 22 contains at least silicon-containing particles 1 and graphite particles 2. The negative electrode mixture layer 22 may further contain a conductive material and a binder.

Log-Differential Pore Volume Distribution

Pores 4 are formed in the negative electrode mixture layer 22. The pores 4 are desirably formed around the silicon-containing particles 1. The pores 4 are desirably formed between the silicon-containing particles 1 and graphite particles 2. The pores 4 are thought to absorb large swelling of the silicon-containing particles 1. This is thought to reduce damage to the electrode structure (disruption of electron conduction paths). For convenience, FIG. 2 shows a state where the silicon-containing particles 1 and the graphite particles 2 have no contact with each other. It is thought that, in an actual situation, the silicon-containing particles 1 are in partial contact with the graphite particles 2 or a conductive material is present between the silicon-containing particles 1 and graphite particles 2 so as to form electron conduction paths between the silicon-containing particles 1 and graphite particles 2.

According to the present embodiment, in a Log-differential pore volume distribution of the negative electrode mixture layer 22, the ratio $(V_2/V_{0.2})$ of a Log-differential pore volume $(V_2)$ at a pore diameter of 2 μm to a Log-differential pore volume $(V_{0.2})$ at a pore diameter of 0.2 μm is 10.5 or more and 33.1 or less. This is expected to provide an improvement in cycle characteristics. It is thought that, due to the negative electrode mixture layer 22 having large poses in an appropriate proportion, large swelling of the silicon-containing particles 1 is absorbed by the pores 4. This is thought to reduce damaged to the electrode structure.

If $V_2/V_{0.2}$ is less than 10.5, the proportion of the pores 4 of large size is low, which can lead to a failure to sufficiently absorb the swelling of the silicon-containing particles 1. If $V_2/V_{0.2}$ is more than 33.1, the proportion of the pores 4 of large size is excessively high, and thus electron conduction paths are intrinsically difficult to form, which can cause decreased use efficiency of the silicon-containing particles 1. That is, the initial capacity and initial efficiency can decline.

The Log-differential pore volume distribution of the negative electrode mixture layer 22 is measured by mercury intrusion porosimetry. The Log-differential pore volume distribution presents a pore volume distribution with pore diameter on the abscissa and Log-differential pore volume on the ordinate. The Log-differential pore volume refers to a value [dV/d(log D)] obtained by dividing a difference in pore volume between measurement points [differential pore volume (dV)] by a logarithmic value of a difference in pore diameter [d(log D)].

The measurement of the Log-differential pore volume distribution is conducted using, for example, a porosimeter available from Shimadzu Corporation (product name: "AutoPore IV 9520") or an equivalent thereof. It is desirable to wash the negative electrode mixture layer 22 prior to the measurement. The washing liquid used may be, for example, ethyl methyl carbonate (EMC). It is desirable that the washed negative electrode mixture layer 22 be left to dry in a low-dew point environment for about 12 hours. The low-dew point environment refers, for example, to an environment where the dew point temperature is −30° C. or lower. From the Log-differential pore volume distribution obtained by the measurement, the Log-differential pore volume ($V_2$) at a pore diameter of 2 μm and the Log-differential pore volume ($V_{0.2}$) at a pore diameter of 0.2 μm are read. $V_2$ is divided by $V_{0.2}$ to calculate $V_2/V_{0.2}$. The measurement of $V_2/V_{0.2}$ is performed at least three times. The arithmetic mean of the at least three measured values is defined as $V_2/V_{0.2}$ of negative electrode mixture layer 22.

$V_2/V_{0.2}$ may be 10.5 or more and 26.6 or less. In this instance, an improvement in cycle characteristics is expected. This is presumably because the fact that $V_2/V_{0.2}$ is 26.6 or less, namely fee proportion of the pores 4 of large size is moderately low, creates a state where the silicon-containing particle 1 and graphite particle 2 are not too far apart from each other. Furthermore, the state where the silicon-containing particle 1 and graphite particle 2 are not too far apart from each other is expected to lead to increased use efficiency of the silicon-containing particle 1. That is, improvements in the initial capacity and initial efficiency are also expected. $V_2/V_{0.2}$ may be, for example, 16.8 or more. In this instance, an improvement in cycle characteristics is expected.

Silicon-Containing Particles

The silicon-containing particles 1 of the present embodiment act as a negative electrode active material. The silicon-containing particles 1 of the present embodiment refer to particles containing silicon. The silicon-containing particles 1 may be particles consisting essentially of silicon. The silicon-containing particles 1 may contain another element as long as they contain silicon. The silicon-containing particles 1 may contain, for example, oxygen. This means that the silicon-containing particles 1 may be silicon oxide particles.

The silicon-containing particles 1 may have, for example, a composition represented by the following formula (I):

$$SiO_x \quad (I),$$

wherein x satisfies 0≤x≤1.5.

In the above formula (I), "x" represents the ratio of the O (oxygen) atom concentration to the Si (silicon) atom concentration. The ratio x can be measured, for example, by Auger election spectroscopy, glow discharge mass spectrometry, or inductively coupled plasma emission spectrometry. The measurement of x is performed at least three times. The arithmetic mean of the at least three measured values is defined as "x". The ratio x may, for example, satisfy it 1≤x≤1.5. In some instances, the silicon-containing particles 1 further contain an element inevitably introduced during production, in addition to silicon and oxygen.

The silicon-containing particles 1 may be particles containing a silicon-based alloy. The silicon-based alloy may be, for example, an alloy of silicon with a metal element such as Cu, zinc (Zn), nickel (Ni), or Al.

The silicon-containing particles 1 may be crystalline. The silicon-containing particles 1 may be non-crystalline (amorphous). The silicon-containing particles 1 may have both a crystalline portion and a non-crystalline portion. The silicon-containing particles 1 may be monocrystalline particles. The silicon-containing particles 1 may be polycrystalline particles.

The silicon-containing particles 1 may have a d50 of, for example, 0.1 μm or more and 10 μm or less. The "d50" refers to a particle size at a cumulative undersize particle volume corresponding to 50% of the total particle volume in a volume-based particle size distribution. The d50 can be measured by a laser diffraction-scattering method. The silicon-containing particles 1 may have a d50 of, for example, 1.3 μm or more and 5.2 μm or less. The shape of the silicon-containing particles 1 should not be particularly limited. The silicon-containing particles 1 may be, for example, spherical particles, rod-shaped particles, or plate-shaped particles.

The content of the silicon-containing particles 1 may be, for example, 1 part by mass or more and 50 parts by mass or less with respect to 100 parts by mass of the graphite particles 2. The content of the silicon-containing particles 1 may be, for example, 5 parts by mass or more with respect to 100 parts by mass of the graphite particles 2. The content of the silicon-containing particles 1 may be, for example, 10 parts by mass or more with respect to 100 parts by mass of the graphite particles 2. The content of the silicon-containing particles 1 may be, for example, 20 parts by mass or more with respect to 100 parts by mass of the graphite particles 2. The content of the silicon-containing particles 1 may be, for example, 40 parts by mass or less with respect to 100 parts by mass of the graphite particles 2.

Graphite Particles

The graphite particles 2 of the present embodiment act as a negative electrode active material. The graphite particles 2 of the present embodiment refer to particles containing a graphite structure. The graphite structure refers to a crystal structure in which carbon hexagonal network layers are stacked. The graphite particles 2 may be particles consisting essentially of graphite. The graphite may be artificial graphite. The graphite may be natural graphite. The graphite particles 2 may be particles containing, for example, soft carbon or hard carbon. The graphite particles 2 may have a larger d50 than the silicon-containing particles 1. In this instance, the likelihood that the pores 4 of large size are formed around the silicon-containing particles 1 can be increased. The graphite particles 2 may have a d50 of, for example, 1 μm or more and 30 μm or less. The graphite particles 2 may have a d50 of, for example, 8 μm or more and 16 μm or less.

Conductive Material

The negative electrode mixture layer 22 may further contain a conductive material. The conductive material assists the electron conduction through the negative electrode mixture layer 22. The conductive material should not be particularly limited. The conductive material may be, for example, carbon black, vapor-grown carbon fibers (VGCF), carbon nanotubes (CNT), graphene flakes, or activated carbon. The carbon black may be, for example, acetylene black (AB) or Ketjenblack (registered trademark). One conductive material may be used alone. Two or more conductive materials may be used in combination. The content of the conductive material may be, for example, 1 part by mass or more and 10 parts by mass or less with respect to 100 parts by mass of the graphite particles 2. Since the graphite particles 2 have electron conductivity, any conductive material may be unnecessary in some instances.

Binder

The negative electrode mixture layer 22 may further contain a binder. The binder binds together the components (particles) in the negative electrode mixture layer 22. The binder binds the negative electrode mixture layer 22 to the negative electrode current collector 21. The binder should not be particularly limited. The binder may be, for example, polyamide (PA), polyimide (PI), polyamideimide (PAI), polyvinylidene fluoride (PVdF), polytetrafluoroethylene (PTFE), vinylidene fluoride-hexafluoropropene copolymer, styrene-butadiene rubber (SBR), carboxymethyl cellulose (CMC), or polyacrylic acid (PAA). One binder may be used alone. Two or more binders may be used in combination. The content of the binder may be, for example, 1 part by mass or more and 10 parts by mass or less with respect to 100 parts by mass of the graphite particles 2.

Positive Electrode

The positive electrode 10 is a sheet. The positive electrode 10 is strip-shaped. The positive electrode 10 includes at least a positive electrode mixture layer. The positive electrode 10 may further include a positive electrode current collector. The positive electrode current collector may be, for example, an Al foil or an Al alloy foil. The positive electrode current collector may have a thickness of, for example, 5 μm or more and 50 μm or less.

The positive electrode mixture layer may be formed, for example, on the surface of the positive electrode current collector. The positive electrode mixture layer may be formed on both major faces of the positive electrode current collector. The positive electrode mixture layer may have a thickness of, for example, 10 μm or more and 200 μm of less. The positive electrode mixture layer may contain at least a positive electrode active material. The positive electrode mixture layer may further contain a conductive material and a binder.

The positive electrode active material can be in the form of particles. The positive electrode active material may have a d50 of, for example, 1 μm or more and 30 μm or less. The positive electrode active material should not be particularly limited. The positive electrode active material may be, for example, $LiCoO_2$, $LiNiO_2$, $LiMnO_2$, $LiMn_2O_4$, $LiNi_pCo_qM_rO_2$ wherein M is. Mn or Al and p, q, and r satisfy $0<p<1$, $0<q<1$, $0<r<1$, and $p+q+r=1$, or $LiFePO_4$. One positive electrode active material may be used alone. Two or more positive electrode active materials may be used in combination.

The conductive material should not be particularly limited. The conductive material may be, for example, any of the materials mentioned as examples of the conductive material of the negative electrode mixture layer 22. One conductive material may be used alone. Two or more conductive materials may be used in combination. The content of the conductive material may be, for example, 1 part by mass or more and 10 parts by mass or less with respect to 100 parts by mass of the positive electrode active material.

The binder should not be particularly limited either. The binder may be, for example, PVdF, PTFE, CMC, or PAA. One binder may be used alone. Two or more binders may be used in combination. The content of the binder may be, for example, 1 part by mass or more and 10 parts by mass or less with respect to 100 parts by mass of the positive electrode active material.

Separator

Referring again to FIG. 1, the separator 30 is a porous film. The separator 30 is disposed between the positive electrode 10 and the negative electrode 20. The separator 30 electrically insulates the positive electrode 10 and negative electrode 20 from each other. The separator 30 may have a thickness of, for example, 10 μm or more and 50 μm or less. The separator 30 can be made of, for example, polyethylene (PE) or polypropylene (PP).

The separator 30 may have, for example, a single-layer structure. The separator 30 may consist solely of, for example, a porous film made of PE. The separator 30 may have, for example, a multilayer structure (such as a three-layer structure). The separator 30 may be made up of, for example, a porous PP film, a porous PE film, and a porous PP film that are stacked in this order. The separator 30 may include a heat-resistant layer on its surface. This heat-resistant layer is also porous. The heat-resistant layer contains a heat-resistant material. The heat-resistant material may be, for example, alumina.

Electrolyte Solution

The electrolyte solution is impregnated in the electrode assembly 40. The electrolyte solution contains a solvent and a supporting salt. The solvent contains at least one selected from the group consisting of EC, FEC, and VC. That is, the electrolyte solution contains at least one selected from the group consisting of EC, FEC, and VC (which may be referred to as "EC etc." hereinafter). The EC etc. may be contained, for example, in an amount of, 1 part by volume or more and 50 parts by volume or less with respect to 100 parts by volume of the solvent. The EC etc. may be contained, for example in an amount of 10 parts by volume or more and 40 parts by volume or less with respect to 100 parts by volume of the solvent.

Solvent

The EC etc. is a cyclic carbonate. The solvent may contain another component as long as the solvent contains the EC etc. Examples of the other component include a cyclic carbonate other than the EC etc., a chain carbonate, a lactone, a cyclic ether, a chain ether, and a carboxylic acid ester.

The cyclic carbonate other than the EC etc. may be, for example, propylene carbonate (PC) or butylene carbonate (BC). The chain carbonate may be, for example, dimethyl carbonate (DMC), ethyl methyl carbonate (EMC), or diethyl carbonate (DEC). When a mixture of the cyclic carbonate and chain carbonate is used, the mixing ratio between the cyclic carbonate and chain carbonate may be, for example, as fellows: "cyclic carbonate/chain carbonate=1/9 to 5/5 (volume ratio)".

The lactone may be, for example, γ-butyrolactone (GBL) or δ-valerolactone. The cyclic ether may be, for example, tetrahydrofuran (THF), 1,3-dioxolane, or 1,4-dioxane. The chain ether may be 1,2-dimethoxyethane (DME). The carboxylic acid ester may be, for example, methyl formate (MF), methyl acetate (MA), or methyl propionate (MP).

Supporting Salt

The supporting salt is dissolved in the solvent. The supporting salt functions as a supporting electrolyte. The electrolyte solution may contain the supporting salt, for example, in an amount of 0.5 mol/l or more and 2.0 mol/l or less. The supporting salt may be, for example, $LiPF_6$, $LiBF_4$, $Li[N(FSO_2)_2]$, or $Li[N(CF_3SO_2)_2]$. One supporting salt may be used alone. Two or more supporting salts may be used in combination.

Additive

The electrolyte solution may further contain any of various additives in addition to the solvent and supporting salt. The electrolyte solution may contain an additive, for example, in an amount of 0.005 mol/l or more and 0.5 mol/l or less. Examples of the additive include a gas forming agent (so-called overcharge protection additive) and an SEI (solid electrolyte interface) layer forming agent.

The gas forming agent may be, for example, cyclohexyl benzene (CHB) or biphenyl (BP). The SEI layer forming agent may be, for example, vinylene carbonate (VC), vinyl ethylene carbonate (VEC), $LiB(C_2O_4)_2$, $LiBF_2(C_2O_4)$, $LiPF_2(C_2O_4)_2$, $LiPO_2F_3$, propane sultone (PS), or ethylene sulfite (ES). One additive may be used alone. Two or more additives may be used in combination.

Method of Producing Non-Aqueous Electrolyte Secondary Battery

Figure 3:
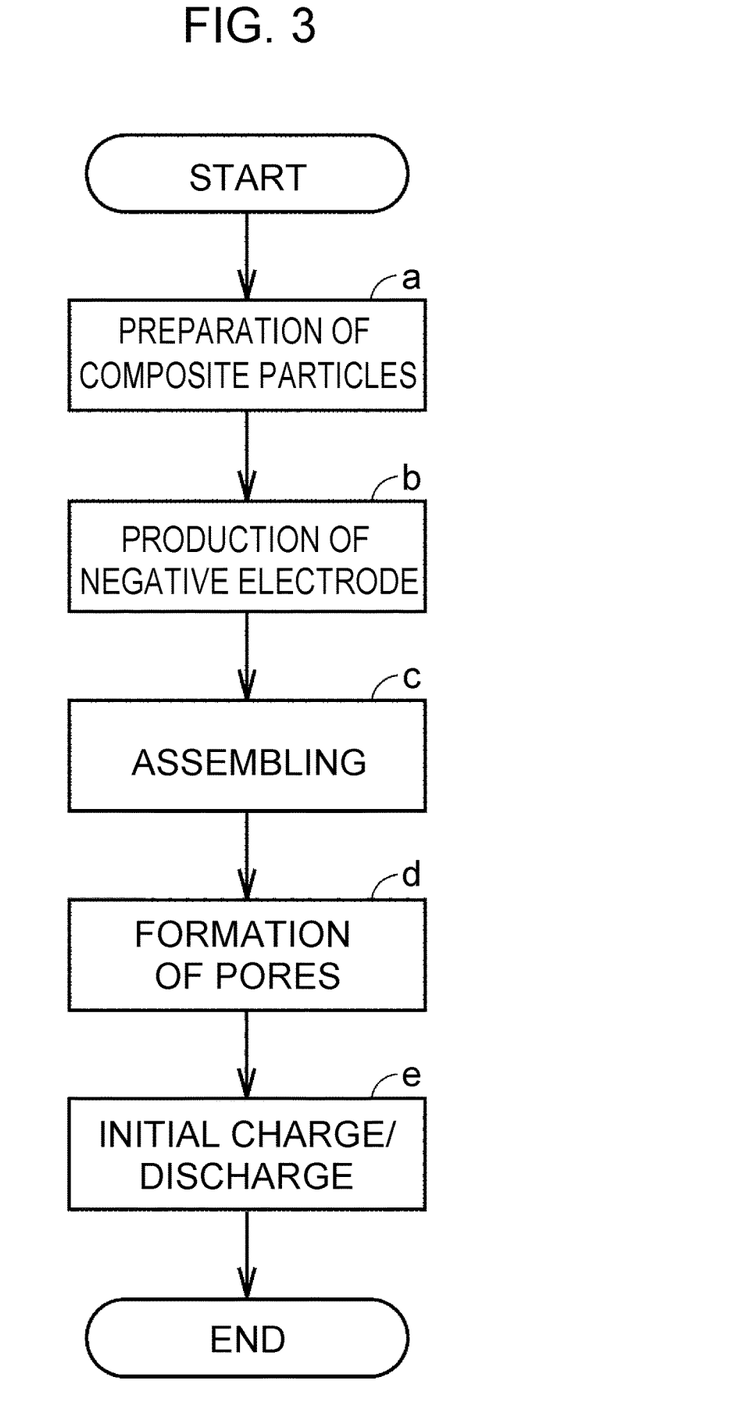
FIG. 3 is a flowchart showing the outline of a method of producing a non-aqueous electrolyte secondary battery according to the present embodiment.

FIG. 3 is a flowchart showing the outline of the method of producing a non-aqueous electrolyte secondary battery according to the present embodiment. The battery production method of the present embodiment includes at least "(a) preparation of composite particles", "(b) production of negative electrode", "(c) assembling", and "(d) formation of pores". The battery production method of the present embodiment may further include "(e) initial charge/discharge".

(a) Preparation of Composite Particles

Figure 4:
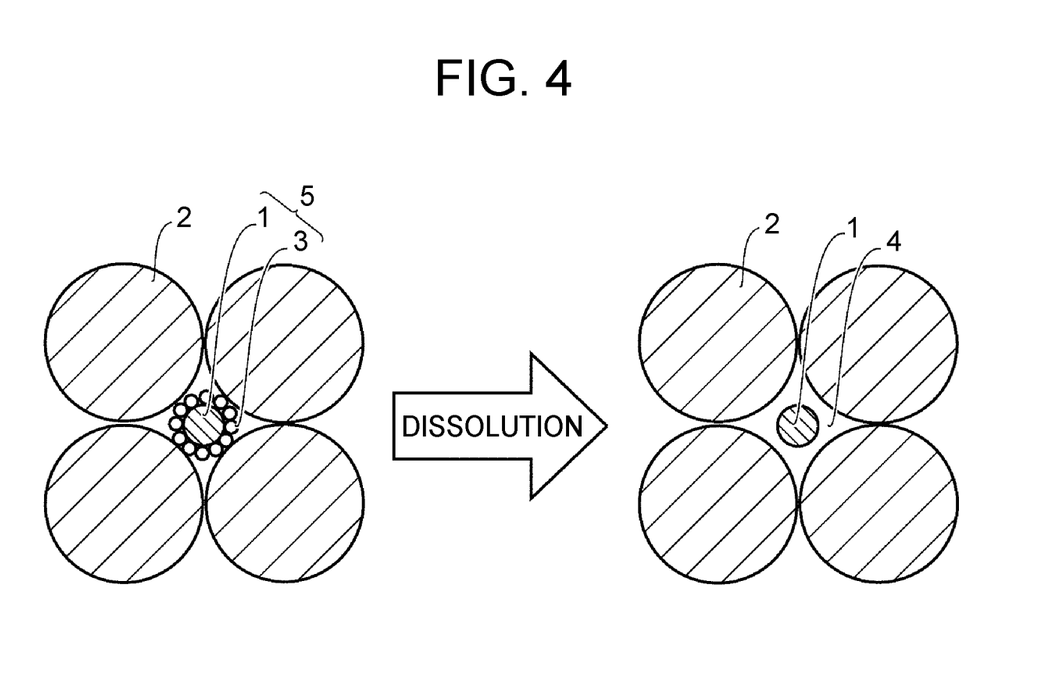
FIG. 4 is a conceptual diagram for illustrating the formation of pores.

Referring now to FIG. 4, the battery production method of the present embodiment includes preparing a composite particle 5 by attaching at least one solid material selected from the group consisting of EC, PEC, and VC (i.e., EC etc.) to the surface of a silicon-containing particle 1.

Referring to FIG. 4, the EC etc. is prepared as a solid material 3. The solid material 3 is typically in the form of powder. In the present embodiment, temperature control is carried out during "(a) preparation of composite particles" to "(c) assembling" to keep the EC etc. from melting. The temperature is controlled to be lower than the melting point of the EC etc. EC has a melting point of, for example, about 37° C. FEC and VC have a melting point of, for example, about 20° C.

The details of the silicon-containing particles 1 are as previously described. The method for attaching the solid material 3 to the surface of the silicon-containing particle 1 should not be particularly limited. For example, a mechanochemical process may be used to attach the solid material 3 to the surface of the silicon-containing particle 1. For the mechanochemical process, for example, "MECHANO FUSION System" available from Hosokawa Micron Corporation, or an equivalent thereof, can be used.

The solid material 3 may be attached over the entire surface of each silicon-containing particle 1. The solid material 3 may be attached to a part of the surface of each silicon-containing particle 1. The amount of the solid material 3 attached may be, for example, 0.1 parts by mass or more 0.6 parts by mass or less with respect to 100 parts by mass of the silicon-containing particles 1. The amount of the solid material 3 attached may be, for example, 0.2 parts by mass or more with respect to 100 parts by mass of the silicon-containing particles 1. The amount of the solid material 1 attached may be, for example, 0.4 parts by mass or less with respect to 100 parts by mass of the silicon-containing particles 1. When two or more solid materials 3 are used, the above amount attached refers to the total amount of the solid materials 3 attached.

(b) Production of Negative Electrode

Referring to FIGS. 2-4, the battery production method of the present embodiment includes producing a negative electrode 20 by forming a negative electrode mixture layer 22 containing at least the composite particles 5 and graphite particles 2.

For example, the composite particles 5, the graphite particles 2, a conductive material, a binder, and a solvent can be mixed to prepare a negative electrode paste. The details of the graphite particles 2 and other materials are as previously described. The negative electrode paste can be applied and dried on the surface of the negative electrode current collector 21 to form the negative electrode mixture layer 22. The solvent is a material in which the solid material 3 (EC etc.) is poorly soluble. The solvent may be, for example, water.

As a result of the formation of the negative electrode mixture layer 22, the negative electrode 20 is produced. The negative electrode mixture layer 22 may be compressed to have a certain density. The negative electrode 20 may be cut into a certain size.

(c) Assembling

Referring to FIGS. 1 and 3, the battery production method of the present embodiment includes assembling a battery 100 including at least the negative electrode 20, a positive electrode 10, and an electrolyte solution.

The details of the positive electrode 10 are as previously described. The method for producing the positive electrode 10 should not be particularly limited. The positive electrode 10 can be prepared by a conventionally known method.

For example, the positive electrode 10, a separator 30, the negative electrode 20, and the separator 30 can be stacked in this order and then spirally wound together to form an electrode assembly 40. The details of the separator 30 are as previously described.

A case 50 is prepared. The electrode assembly 40 is placed inside the case 50. The like electrode assembly 40 is electrically connected to an external terminal. The electrolyte solution is injected into the case 50. The details of the electrolyte solution are as previously described. The case 50 is hermetically closed. Thus, the battery 100 is assembled.

(d) Formation of Pores

Referring to FIGS. 2 and 3, the battery production method of the present embodiment includes forming pores 4 in the negative electrode mixture layer 22 by dissolving the solid material 3 in the electrolyte solution.

FIG. 4 is a conceptual diagram for illustrating the formation of the pores. For example, the battery 100 can be left to stand for a certain time after the injection of the electrolyte solution to dissolve the solid material 3 (EC etc.) in the electrolyte solution. This is thought to result in the formation of the pores 4 of large size around the silicon-containing particles 1. The standing time may be, for example, 5 hours or more and 24 hours or less. The standing time refers to the period of time between the injection of the electrolyte solution and the initial charge/discharge. The standing time may be, for example, 5 hours or more and 12 hours or less. To accelerate the dissolution of the solid material 3, the battery 100 may be heated. The battery 100 may be heated, for example, to a temperature of 35° C. or higher and 45° C. or lower.

The formation of the pores 4 is desirably carried out before the initial charge. If the initial charge is performed before the formation of the pores 4 (namely before the dissolution of the EC etc.), the silicon-containing particles 1 swell to squash the solid material 3, and thus the subsequent dissolution of the EC etc. may fail to result in the formation of the pores 4 of large size.

In the battery production method of the present embodiment, the pores 4 are formed such that $V_2/V_{0.2}$ is 10.5 or more and 33.1 or less. Thus, an improvement in cycle characteristics is expected. This is presumably because, due to the negative electrode mixture layer 22 having the pores 4 of large size in an appropriate proportion, large swelling of the silicon-containing particles 1 is absorbed by the pores 4. $V_2/V_{0.2}$ can be adjusted, for example, depending on the combination of factors such as the d50 of the silicon-containing particles 1, the manner of the attachment of the solid material 3 (the degree of covering of the silicon-containing particles 1), the amount of the solid material 3 attached, the compression ratio of the negative electrode mixture layer 22, and the standing time after the injection of the electrolyte solution. The formation of the pores 4 may be accomplished so as to yield $V_2/V_{0.2}$ of 10.5 or more and 26.6 or less. In this instance, an improvement in cycle characteristics is expected. This is presumably because the moderately low proportion of the pores 4 of large size leads to a state where the silicon-containing particle 1 and graphite particle 2 are not too far apart from each other. Furthermore, the state where the silicon-containing particle 1 and graphite particle 2 are not too far apart from each other is expected to lead to increased use efficiency of the silicon-containing particles 1. That is, improvements in the initial capacity and initial efficiency are also expected.

(e) Initial Charge/Discharge

The battery production method of the present embodiment may include carrying out initial charge/discharge of the battery 100 after forming the pores 4. Through the above procedures, the battery 100 can be produced. $V_2/V_{0.2}$ in the present embodiment refers to a value measured for the battery 100 having undergone "(e) initial charge/discharge".

Hereinafter, examples of the present disclosure will be described. It should be noted that the following description is not intended to limit the scope of the appended claims.

Example 1

(a) Preparation of Composite Particles

The following materials were prepared.
Silicon-containing particles 1: SiO ($SiO_1$), d50=5.2 μm
Solid material 3: EC (powder)
Composite particles 5 were prepared using "MECHANO FUSION System" available from Hosokawa Micron Corporation. The preparation of the composite particle 5 was performed by attaching the solid material 3 to the surface of the silicon-containing particle 1. The amount of the solid material 3 attached was 0.1 parts by mass with respect to 100 parts by mass of the silicon-containing particles 1.

(b) Production of Negative Electrode

The following materials were prepared.
Graphite particles 2: Natural graphite
Conductive material: AB
Binder: PI
Negative electrode current collector 21: Cu foil The composite particles 5, graphite particles 2, conductive material, binder, and solvent were mixed to prepare a negative electrode paste. The negative electrode paste was applied and dried on the surface (both major faces) of the negative electrode current collector 21 to form a negative electrode mixture layer 22. In the negative electrode mixture layer 22, the content of the silicon-containing particles 1 was 30 parts by mass with respect to 100 parts by mass of the graphite particles 2. The content of the conductive material was 5 parts by mass with respect to 100 parts by mass of the graphite particles 2. The content of the binder was 4 parts by mass with respect to 100 parts by mass of the graphite particles 2. The negative electrode mixture layer 22 was compressed. Thus, a negative electrode 20 was produced.

(c) Assembling

A positive electrode 10 was prepared. The positive electrode active material was $LiNi_{1/3}Co_{1/3}Mn_{1/3}O_2$. A separator 30 was prepared. The separator 30 was a porous film made of PE. The positive electrode 10, separator 30, negative electrode 20, and separator 30 were stacked in this order and then spirally wound together to form an electrode assembly 40.

A case 50 was prepared. The case 50 was of cylindrical shape. The electrode assembly 40 was placed in the case 50. An electrolyte solution was injected into the case 50. The electrolyte solution contained components listed below. The case 50 was hermetically closed. Thus, a battery 100 was assembled.

Solvent: $LiPF_6$ (1 mol/l)

Supporting salt: [EC/DMC/EMC=3/4/3 (volume ratio)]

(d) Formation of Pores

After the assembling of the battery 100, the battery 100 was left to stand in a room temperature environment for 12 hours. This is thought to have resulted in dissolution of the solid material 3 and hence the formation of pores 4 in the negative electrode mixture layer 22. The pores 4 formed as a result of the dissolution of the solid material 3 are thought to be situated around the silicon-containing particles 1. The pores 4 formed as a result of the dissolution of the solid material 3 are thought to be of large size.

(e) Initial Charge/Discharge

The battery 100 was charged by a constant current-constant voltage charging scheme at 25° C. Thus, the initial charge capacity was measured. The current rate during the constant current charge was 0.1 C. The voltage during the constant-voltage charge was 4.1 V. After the charge, the battery 100 was discharged by a constant current-constant voltage discharging scheme. Thus, the initial discharge capacity was measured. The current rate during the constant current discharge was 0.1 C. The voltage during the constant voltage discharge was 3 V. At a current rate of "1 C", the rated capacity of the battery 100 is discharged over 1 hour. "0.1 C" refers to a current rate corresponding to ⅒ of 1 C.

The initial capacity shown in Table 1 below is the initial discharge capacity. The initial discharge capacity was divided by the initial charge capacity to calculate the initial efficiency. Through the above procedures, the battery 100 was produced. In the present disclosure, two batteries 100 were produced for each of Examples and Comparative Examples.

Comparative Example 1

A battery 100 was produced in the same manner as in Example 1, except for using the silicon-containing particles 1 by themselves without preparing composite particles 5.

Examples 2 to 4

Batteries 100 were produced in the same manner as in Example 1, except for changing the amount of the solid material 3 attached as shown in Table 1 below.

Comparative Example 2

A battery 100 was produced in the same manner as in Example 3, except for changing the standing time after electrolyte solution injection to 2 hours.

Comparative Example 3

A battery 100 was produced in the same manner as in Comparative Example 1, except for using silicon-containing particles 1 having a d50 of 1.3 µm.

Examples 5 to 8

Batteries 100 were produced in the same manner as in Examples 1 to 4, except for using silicon-containing particles 1 having a d50 of 1.3 µm.

Examples 9 to 12

Batteries 100 were produced in the same manner as in Examples 1 to 4, except for using FEC as the solid material 3.

Comparative Example 5

A battery 100 was produced in the same manner as in Comparative Example 2, except for using FEC as the solid material 3.

Example 13 to 16

Batteries 100 were produced in the same manner as in Examples 5 to 8, except for using FEC as the solid material 3.

Comparative Example 6

A battery 100 was produced in the same manner as in Comparative Example 4, except for using FEC as the solid material 3.

Example 17 to 20

Batteries 100 were produced in the same manner as in Examples 1 to 4, except for using VC as the solid material 3.

Comparative Example 7

A battery 100 was produced in the same manner as in Comparative Example 2, except for using VC as the solid material 3.

Example 21 to 24

Batteries 100 were produced in the same manner as in Examples 5 to 8, except for using VC as the solid material 3.

Comparative Example 8

A battery 100 was produced in the same manner as in Comparative Example 4, except for using VC as the solid material 3.

Evaluation

Log-Differential Pore Volume Distribution

Each battery 100 was disassembled after the initial charge/discharge. Thus, the negative electrode 20 was collected. The negative electrode 20 was washed with EMC. After the washing, the negative electrode 20 was dried in a low-dew point environment for 12 hours. After the drying, the log-differential pore volume distribution of the negative electrode mixture layer 22 was measured. The measurement apparatus used was a porosimeter available from Shimadzu Corporation (product name: "AutoPore IV 9520"). Based on the Log-differential pore volume distribution, the ratio ($V_2/V_{0.2}$) of the Log-differential pore volume ($V_2$) at a pore diameter of 2 µm to the Log-differential pore volume ($V_{0.2}$) at a pore diameter of 0.2 µm was calculated. The results are shown in Tables 1 to 3 below.

Cycle Characteristics

Each battery was subjected to 100 cycles of charge/discharge cycling between 3 V and 4.1 V at a current rate of 2 C. "2 C" refers to a current rate corresponding to twice 1 C. The discharge capacity after the 100 cycles was divided by the initial discharge capacity to calculate the capacity retention ratio. The values of the capacity retention ratio are shown in Tables 1 to 3 below. It is thought that the higher the capacity retention ratio is, the better the cycle characteristics are.

TABLE 1

List of Examples and Comparative Examples No. 1

| | Composite particles | | | | Standing | Negative electrode | Initial charge/discharge | | Cycle characteristics |
|---|---|---|---|---|---|---|---|---|---|
| | Solid material | | Silicon-containing particles | | time after electrolyte | mixture layer Log-differential pore | | | |
| | | Amount attached | | | solution | volume distribution | | | Capacity |
| | Type | Parts by mass | Type | d50 µm | injection Time | $V_2/V_{0.2}$ | Initial capacity* | Initial efficiency % | retention ratio % |
| Comparative Example 1 | — | 0 | SiO | 5.2 | 12 | 8.2 | 1 | 75 | 52 |
| Example 1 | EC | 0.1 | SiO | 5.2 | 12 | 10.5 | 1.01 | 79 | 81 |
| Example 2 | EC | 0.2 | SiO | 5.2 | 12 | 17.6 | 1.02 | 82 | 85 |
| Example 3 | EC | 0.4 | SiO | 5.2 | 12 | 26.6 | 1.21 | 83 | 87 |
| Example 4 | EC | 0.6 | SiO | 5.2 | 12 | 32.2 | 0.95 | 71 | 72 |
| Comparative Example 2 | EC | 0.4 | SiO | 5.2 | 2 | 7.5 | 0.98 | 70 | 48 |
| Comparative Example 3 | — | 0 | SiO | 1.3 | 12 | 9.3 | 1.01 | 76 | 63 |

TABLE 1-continued

List of Examples and Comparative Examples No. 1

| | Composite particles | | | | Standing time after electrolyte solution injection Time | Negative electrode mixture layer Log-differential pore volume distribution $V_2/V_{0.2}$ | Initial charge/discharge | | Cycle characteristics Capacity retention ratio % |
|---|---|---|---|---|---|---|---|---|---|
| | Solid material | | Silicon-containing particles | | | | | | |
| | | Amount attached | | | | | Initial capacity* | Initial efficiency % | |
| | Type | Parts by mass | Type | d50 μm | | | | | |
| Example 5 | EC | 0.1 | SiO | 1.3 | 12 | 11.8 | 1.02 | 80 | 82 |
| Example 6 | EC | 0.2 | SiO | 1.3 | 12 | 21.2 | 1.12 | 80 | 84 |
| Example 7 | EC | 0.4 | SiO | 1.3 | 12 | 26.5 | 1.17 | 84 | 88 |
| Example 8 | EC | 0.6 | SiO | 1.3 | 12 | 33.1 | 0.93 | 74 | 76 |
| Comparative Example 4 | EC | 0.4 | SiO | 1.3 | 2 | 9.7 | 0.95 | 72 | 54 |

*The values of the initial capacity are relative values determined by defining the initial capacity of Comparative Example 1 as 1.

TABLE 2

List of Examples and Comparative Examples No. 2

| | Composite particles | | | | Standing time after electrolyte solution injection Time | Negative electrode mixture layer Log-differential pore volume distribution $V_2/V_{0.2}$ | Initial charge/discharge | | Cycle characteristics Capacity retention ratio % |
|---|---|---|---|---|---|---|---|---|---|
| | Solid material | | Silicon-containing particles | | | | | | |
| | | Amount attached | | | | | Initial capacity* | Initial efficiency % | |
| | Type | Parts by mass | Type | d50 μm | | | | | |
| Example 9 | FEC | 0.1 | SiO | 5.2 | 12 | 10.6 | 1.07 | 83 | 83 |
| Example 10 | FEC | 0.2 | SiO | 5.2 | 12 | 18.2 | 1.11 | 84 | 82 |
| Example 11 | FEC | 0.4 | SiO | 5.2 | 12 | 26.1 | 1.16 | 86 | 85 |
| Example 12 | FEC | 0.6 | SiO | 5.2 | 12 | 31.7 | 0.92 | 70 | 77 |
| Comparative Example 5 | FEC | 0.4 | SiO | 5.2 | 2 | 8.1 | 0.99 | 74 | 53 |
| Example 13 | FEC | 0.1 | SiO | 1.3 | 12 | 12.3 | 1.04 | 82 | 83 |
| Example 14 | FEC | 0.2 | SiO | 1.3 | 12 | 22.0 | 1.05 | 82 | 84 |
| Example 15 | FEC | 0.4 | SiO | 1.3 | 12 | 26.6 | 1.12 | 83 | 83 |
| Example 16 | FEC | 0.6 | SiO | 1.3 | 12 | 33.0 | 0.93 | 73 | 78 |
| Comparative Example 6 | FEC | 0.4 | SiO | 1.3 | 2 | 10.1 | 0.92 | 71 | 49 |

*The values of the initial capacity are relative values determined by defining the initial capacity of Comparative Example 1 as 1.

TABLE 3

List of Examples and Comparative Examples No. 3

| | Composite particles | | | | Standing time after electrolyte solution injection Time | Negative electrode mixture layer Log-differential pore volume distribution $V_2/V_{0.2}$ | Initial charge/discharge | | Cycle characteristics Capacity retention ratio % |
|---|---|---|---|---|---|---|---|---|---|
| | Solid material | | Silicon-containing particles | | | | | | |
| | | Amount attached | | | | | Initial capacity* | Initial efficiency % | |
| | Type | Parts by mass | Type | d50 μm | | | | | |
| Example 17 | VC | 0.1 | SiO | 5.2 | 12 | 10.6 | 1.12 | 81 | 83 |
| Example 18 | VC | 0.2 | SiO | 5.2 | 12 | 16.8 | 1.15 | 81 | 84 |
| Example 19 | VC | 0.4 | SiO | 5.2 | 12 | 24.5 | 1.18 | 82 | 85 |
| Example 20 | VC | 0.6 | SiO | 5.2 | 12 | 32.8 | 0.96 | 73 | 79 |

TABLE 3-continued

List of Examples and Comparative Examples No. 3

| | Composite particles | | | | Standing time after electrolyte solution injection Time | Negative electrode mixture layer Log-differential pore volume distribution $V_2/V_{0.2}$ | Initial charge/discharge | | Cycle characteristics Capacity retention ratio % |
|---|---|---|---|---|---|---|---|---|---|
| | Solid material | | Silicon-containing particles | | | | | | |
| | Type | Amount attached Parts by mass | Type | d50 μm | | | Initial capacity* | Initial efficiency % | |
| Comparative Example 7 | VC | 0.4 | SiO | 5.2 | 2 | 8.7 | 0.97 | 72 | 48 |
| Example 21 | VC | 0.1 | SiO | 1.3 | 12 | 13.1 | 1.09 | 81 | 85 |
| Example 22 | VC | 0.2 | SiO | 1.3 | 12 | 20.7 | 1.11 | 82 | 84 |
| Example 23 | VC | 0.4 | SiO | 1.3 | 12 | 25.8 | 1.16 | 85 | 84 |
| Example 24 | VC | 0.6 | SiO | 1.3 | 12 | 32.9 | 0.92 | 72 | 76 |
| Comparative Example 8 | VC | 0.4 | SiO | 1.3 | 2 | 8.6 | 0.97 | 74 | 51 |

*The values of the initial capacity are relative values determined by defining the initial capacity of Comparative Example 1 as 1.

Results

As seen from Tables 1 to 3, Examples where $V_2/V_{0.2}$ is 10.5 or more and 33.1 or less show an improvement in cycle characteristics as compared to Comparative Examples where the condition concerning $V_2/V_{0.2}$ is not satisfied. This is presumably because, due to the negative electrode mixture layer 22 having the pores 4 of large size in an appropriate proportion, large swelling of the silicon-containing particles 1 is absorbed by the pores 4.

Comparative Example 1 (Table 1) shows poor cycle characteristics. In Comparative Example 1, $V_2/V_{0.2}$ is less than 10.5. It is thought that the proportion of the pores 4 of large size is insufficient because of the non-use of the solid material 3 (EC etc.).

Comparative Examples 2 and 4 (Table 1), Comparative Examples 5 and 6 (Table 2), and Comparative Examples 7 and 8 (Table 3) show poor cycle characteristics, despite the use of the solid material 3. It is thought that the formation of the pores 4 of large size is not sufficient because of the short standing time after electrolyte solution injection.

In Examples where $V_2/V_{0.2}$ is 10.5 or more and 26.6 or less, an improving trend of cycle characteristics is observed. This is presumably because of creation of a state where the silicon-containing particle 1 and graphite particle 2 are not too far apart from each other. In Examples where $V_2/V_{0.2}$ is 10.5 or more and 26.6 or less, improvements in initial capacity and initial efficiency are also observed.

As seen from Tables 1 to 3, all of Examples where the solid material 3 is EC, FEC, or VC show an improvement in cycle characteristics. Thus, the combined use of two or more of EC, FEC, and VC is also thought to provide an improvement in cycle characteristics.

The embodiment and examples as disclosed herein are intended to be illustrative in all respects, rather than restrictive. The technical scope defined by the appended claims encompasses all changes which come within the meaning and range of equivalency of the claims.

What is claimed is:

1. A non-aqueous electrolyte secondary battery comprising:
   a negative electrode, the negative electrode including a negative electrode mixture layer, the negative electrode mixture layer including a silicon-containing particle and a graphite particle, wherein in a Log-differential pore volume distribution of the negative electrode mixture layer, a ratio of a Log-differential pore volume at a pore diameter of 2 μm to a Log-differential pore volume at a pore diameter of 0.2 μm is within a range of 10.5 to 33.1;
   a positive electrode; and
   an electrolyte solution including at least one selected from the group consisting of ethylene carbonate, fluoroethylene carbonate, and vinylene carbonate.

2. The non-aqueous electrolyte secondary battery according to claim 1, wherein the ratio is within a range of 10.5 to 26.6.

3. A method of producing a non-aqueous electrolyte secondary battery, comprising:
   preparing a composite particle by attaching at least one solid material selected from the group consisting of ethylene carbonate, fluoroethylene carbonate, and vinylene carbonate to a surface of a silicon-containing particle;
   producing a negative electrode by forming a negative electrode mixture layer including the composite particle and a graphite particle;
   assembling a non-aqueous electrolyte secondary battery including the negative electrode, a positive electrode, and an electrolyte solution; and
   forming pores in the negative electrode mixture layer by dissolving the solid material in the electrolyte solution, wherein the pores are formed such that in a Log-differential pore volume distribution of the negative electrode mixture layer, a ratio of a Log-differential pore volume at a pore diameter of 2 μm to a Log-differential pore volume at a pore diameter of 0.2 μm is within a range of 10.5 to 33.1.

4. The method of producing a non-aqueous electrolyte secondary battery according to claim 3, wherein the pores are formed such that the ratio is within a range of 10.5 to 26.6.

5. The method of producing a non-aqueous electrolyte secondary battery according to claim 3, further including carrying out initial charge of the non-aqueous electrolyte secondary battery after forming the pores in the negative electrode mixture layer.

* * * * *

UNITED STATES PATENT AND TRADEMARK OFFICE
CERTIFICATE OF CORRECTION

PATENT NO. : 10,886,569 B2
APPLICATION NO. : 16/141211
DATED : January 5, 2021
INVENTOR(S) : Ryosuke Ohsawa, Akira Tsujiko and Kaoru Inoue It is certified that error appears in the above-identified patent and that said Letters Patent is hereby corrected as shown below:

In the Specification

In Column 1, Line(s) 56, delete "fey" and insert --the--, therefor.

In Column 2, Line(s) 45, after "particle", insert --;--.

In Column 3, Line(s) 48, delete "now-aqueous" and insert --non-aqueous--, therefor.

In Column 5, Line(s) 45, delete "fee" and insert --the--, therefor.

In Column 6, Line(s) 13, after "satisfy", delete "it".

In Column 8, Line(s) 66, delete "fellows" and insert --follows--, therefor.

In Column 9, Line(s) 44, delete "PEC" and insert --FEC--, therefor.

In Column 10, Line(s) 6, after "material", delete "1" and insert --3--, therefor.

In Column 10, Line(s) 44, after "The", delete "like".

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*